United States Patent [19]

Goel

[11] Patent Number: 4,762,883

[45] Date of Patent: Aug. 9, 1988

[54] SOLUTIONS OF POLYMERS IN OXAZOLINES AND POLYMERIZATES THEREOF

[75] Inventor: Anil Goel, Worthington, Ohio

[73] Assignee: Ashland Oil, Inc., Ashland, Ky.

[21] Appl. No.: 730,613

[22] Filed: May 6, 1985

[51] Int. Cl.$^4$ .............................................. C08L 79/00
[52] U.S. Cl. .................................... 525/113; 525/123; 525/132; 525/186; 525/390; 525/391; 525/395; 525/396; 525/397; 525/403; 525/404; 525/407; 525/408; 525/410; 525/411; 525/412; 525/413; 525/420; 525/423; 525/424; 525/426; 525/437; 525/438; 525/440; 525/445; 525/453; 525/454; 525/457; 525/462; 525/463; 525/467; 525/468; 525/536
[58] Field of Search ................. 528/73; 525/113, 123, 525/132, 186, 390, 391, 395, 396, 397, 403, 404, 407, 408, 410, 411, 412, 413, 420, 423, 424, 426, 437, 438, 440, 445, 453, 454, 457, 462, 463, 467, 468, 536

[56] References Cited

U.S. PATENT DOCUMENTS

| | | | |
|---|---|---|---|
| 3,822,237 | 7/1974 | Alford | 528/73 |
| 3,966,836 | 6/1976 | de Cleur | 525/438 |
| 4,028,312 | 6/1977 | Ball | 528/73 |
| 4,474,942 | 10/1984 | Sano | 528/363 |

FOREIGN PATENT DOCUMENTS

| | | | |
|---|---|---|---|
| 56-045953 | 4/1981 | Japan | 525/437 |
| 56-049756 | 5/1981 | Japan | 525/437 |

*Primary Examiner*—Patricia Short
*Attorney, Agent, or Firm*—John F. Jones

[57] ABSTRACT

A solution of a non-reactive polymer in a liquid oxazoline which may include a reactive additive such as a polyisocyanate to provide solid polymers by interpolymerization of the oxazoline and reactive additive are described.

16 Claims, No Drawings

SOLUTIONS OF POLYMERS IN OXAZOLINES AND POLYMERIZATES THEREOF

This invention relates to solutions of polymers in oxazoline solvents and to polymerizates produced therefrom by condensation polymerization of such solutions with a reactive monomer or polymer such as a polyisocyanate.

I have discovered that liquid oxazolines, particularly 2-alkyl oxazolines, will dissolve many polymers to form solutions having reasonably low viscosities and these solutions can contain from 10 to 50 percent by weight of polymer and preferably from about 10 to 30 percent by weight of polymer. These solutions can be used, per se, for coatings, adhesives, and the like, or they can be caused to undergo further polymerization through the oxazoline groups to give novel polymer blends which are usually solid, tough materials. Various fillers, colorants, pigments, processing aids, and the like which are well known to those skilled in the art can be included in the solutions and further polymerized solutions and products of this invention.

Although oxazolines are known to react with a number of reagents having reactive groups such as carboxylic acid, carboxylic anhydride, phenolics, thiols, isocyanate, and the like, the use of oxazolines as reactive solvents for polymers and the formation of polymer blends by reacting the oxazolines containing the dissolved polymers with one or more of the above-mentioned reactive molecules have not heretofore been disclosed. I have found that certain oxazolines as defined hereinafter will dissolve a variety of polymeric materials including polyesters, styrene/acrylonitrile copolymers, polysulfones, polycarbonates, polyoxazolines, and the like. The temperature at which the polymers are dissolved in the oxazolines may be from about room temperature to 100 degrees C. The oxazolines used in producing such polymer solutions can subsequently be reacted with a number of reactive materials including polyisocyanates, polycarboxylic acids, polyphenols, carboxylic anhydrides and the like to produce useful polymer blends. The oxazolines useful in this invention can include either mono-oxazolines of Formula I or bis-oxazolines of Formula II or both.

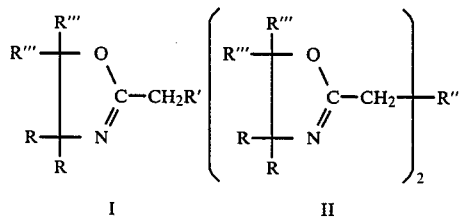

wherein R and R''' independently represents hydrogen, an alkyl group having from 1 to 10 carbon atoms or a hydroxyalkyl group having from 1 to 10 carbon atoms, R' represents hydrogen, an alkyl group having from 1 to 19 carbon atoms, an aryl group having from 6 to 12 carbon atoms, or a hydroxy alkyl group having from 1 to 11 carbon atoms, and R" represents an alkylene group having from 1 to 12 carbon atoms or an arylene group having from 6 to 12 carbon atoms.

In the reactions of oxazolines with reactive groups such as isocyanate, carboxylic anhydride and unsaturated carboxylic acids, the oxazolines act as bifunctional molecules whereas with groups as phenolics, saturated carboxylic acids, thiols, and epoxides, the oxazolines function as monofunctional groups. For the homopolymerization of oxazolines, the known catalysts such as Lewis acids, sulfuric acids, tin tetrochloride, and various other cationic catalysts can be used as is known in the art. The reaction of oxazoline with polyisocyanate can be catalyzed by tertiary amine catalysts. Optionally in these reactions one can use reactive additives such as polyols, polyepoxides, and the like. The polymerization of the solutions are usually carried out at a temperature in the range of from about room temperature to about 200 degrees C. The polymerization can also be carried out in the presence of known fillers such as glass, talc, calcium carbonate, and the like.

The polymers which are not reactive with oxazolines which can be dissolved in the oxazolines to form the solutions of this invention include polyesters, polyethers, polysulfones, polyamides, polycarbonates, polyphenylene oxides, styrene-acrylonitrile copolymers, polyoxazolines, polyacrylates, polyurethanes, and the like.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diisocyanate, xylylene-1,3-diisocyanate, 4,4' diphenylene methane diisocyanate, 4,4'-diphenylene propane diisocyanate, 1,2,3,4-tetraisocyanato butane, butane-1.2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The non-reactive polymer-oxazoline solutions embodied in this invention can be further polymerized with other reactive monomers and polymers containing reactive groups and such reactive monomers and polymers which are more preferred include the aforementioned polyisocyanates, bis- and poly-carboxylic acid containing monomers and polymers, carboxylic acid anhydrides, bis and polyphenolics, thiols, acrylic acids and the like. The ratio of oxazoline to unreactive polymer can be in the range of from 99:1 to 50:50 by weight and the equivalent weight ratio of oxazoline to reactive monomer or polymer in the solution can be from 1:0.8 to 1:3.

The polymerization of the solutions of this invention are carried out at temperatures in the range of from about room temperature or slightly below to about 200 degrees C. In regard to equivalent ratios, the oxazolines are bifunctional in relation to anhydrides and isocyanates and they are monofunctional in relation to phenolics, carboxylic acids and thiols.

The invention is further illustrated in the following representative examples.

EXAMPLE 1

To 30 g of an oxazoline of Formula I in which R and R''' are hydrogen and R' is methyl was added 7 g of polycaprolactone (polyester with molecular weight greater than 30,000). The resulting mixture was stirred at room temperature under nitrogen in a closed reactor overnight. A clear solution resulted. The solution of caprolactone polymer in oxazoline was mixed with 0.3 g of tertiary amine catalyst (Polycat 41 from Abbott Chemical Co. which is N, N', N''-tris (dimethylamino propyl hexahydrotriazine)) degassed and mixed with 95 g of degassed liquid 4,4'-methylene bis(phenyl isocyanate) and the resulting solution was poured into a mold formed by parallel glass plates coated with silicone mold release and the plates were separated by ⅛ inch spacers. The mold was then placed in an oven at 100 degrees C. for one hour. The resulting opaque solid polymer which was removed from the mold was found to have an ASTM-D648 heat distortion temperature of 191 degrees C. and an ASTM-D256 notched izod impact strength of 0.3 foot pounds/inch of notch. The Flexural strength was found to be 18,993 psi and the modulus (ASTM-D-790) was 428,291 psi.

EXAMPLE 2

In this example, which is outside the scope of the present invention, the procedure of Example 1 was followed except that no polycaprolactone polymer was used. The cured product was a transparent sheet which was found to be too brittle to be tested for the usual physical properties given for the product of Example 1.

EXAMPLE 3

To 28 g of the oxazoline of Example 1 was added 5 g of an oxazoline of Formula I in which R is methyl, R''' is hydrogen and R' is hexyl. To this mixture was added 7.5 g of polycaprolactone polymer. The resulting mixture was stirred at room temperature under nitrogen to give a clear solution. This solution was mixed with 96 g of the polyisocyanate of Example 1 and treated in a manner similar to that described in Example 1 to give an opaque, solid polymer sheet which was found to have a heat distortion temperature of 190 degrees C. and a notched izod impact strength of 0.35 foot pounds/inch of notch.

EXAMPLE 4

The procedure of Example 1 was followed using 28 g of the oxazoline of Example 1, 5 g of a bis oxazoline of Formula II in which R and R''' are hydrogen and R'' is methylene, and 7 g of polycaprolactone. The polymer obtained after reaction with 97 g of the polyisocyanate was found to have a heat distortion temperature of 188 degrees C. and a notched izod impact strength of 0.3 foot pounds/inch of notch.

EXAMPLE 5

A series of solutions were prepared using the ethyl oxazoline described in Example 1, tertiary amine catalyst, 4,4'-methylene bis(phenyl isocyanate) and polymer such as SAN (styrene/acrylonitrile copolymer 72:28 by weight, molecular weight greater than 100,000), PC (polycarbonate of molecular weight of 30,000 to 50,000), PE (polycaprolactone, a polyester), PS (polysulfone of high molecular weight), PEOx (polyethyl oxazoline - homopolymer of 2-ethyl oxazoline with molecular weight of 200,000). The solutions of oxazoline, polymer and polyisocyanate were all treated to form solid polymer sheets as described in Example 1. The materials used and the results obtained are given in the following Table. The amount of tertiary amine catalyst used in each example was 0.3 g.

TABLE

| Example Number | Ethyl Oxazoline (g) | Polymer (g) | % Polymer in Solution | Polyisocyanate (g) | Polymer Properties | |
|---|---|---|---|---|---|---|
| | | | | | HDT | NII |
| 5 | 31.5 | 3.3 (PE) | 9.5 | 97.5 | 185 | 0.28 |
| 6 | 29 | 4.5 (SAN) | 13.5 | 96.7 | 185 | 0.2 |
| 7 | 30 | 4.5 (PS) | 13 | 95 | 187 | 0.3 |
| 8 | 29 | 4 (PC) | 12 | 91.7 | 184 | 0.26 |
| 9 | 30 | 4.5 (PEOx) | 13 | 96 | 184 | 0.2 |

EXAMPLE 10

To 87 g of the ethyl oxazoline described in Example 1 was added 21 g of polycaprolactone and the mixture was stirred overnight at room temperature to give a clear solution. The solution was divided into three parts and to each part was added a reactive monomer as described below ultimately to obtain solid polymer blends.

A. To 36 g of the above solution was added 0.15 g of lithium fluoroborate catalyst and the mixture was stirred at room temperature to dissolve the catalyst. This solution was heated at 100 degrees C. for 15 hours during which time the oxazoline homopolymerized to give an opaque solid polymer blend. This material was found to be thermoplastic. A small amount of this hot melt polymer blend was applied between two steel panels with one square inch overlap and the bond thickness of about 30 mils and was tested for sheer strength at room temperature which was found to be about 800 psi.

B. To 36 g of the polymer solution was added 28 g of maleic anhydride (powdered) at about 15 degrees C. An endothermic dissolution occurred and after the complete dissolution of maleic anhydride, the reaction mixture was brought to room temperature. An extremely exothermic reaction occurred within 2-3 minutes to give a dark red solid polymer which was found to be mostly soluble in acetone.

C. To 12 g of the polymer solution was added 8.5 g of methacrylic acid and the reaction solution was heated at 100 degrees C. for 15 hours. The viscosity of the solution, during this time, changed from mobile liquid to viscous liquid to pasty solid to hard solid. The polymer blend was translucent and solid at room temperature.

EXAMPLE 11

A solution of the oxazoline mixture with the polyester described in Example 4 was prepared and mixed with 0.2 g of the lithium fluoroborate catalyst. This mixture was heated at 100 degrees C. for 8 hours followed by 10 hours of 130 degrees C. to give an opaque solid.

EXAMPLE 12

A solution of 30 g of the ethyl oxazoline of Example 1 and 5 g of styrene/acrylonitrile copolymer was mixed with 0.2 g of lithium fluoroborate. The solution was heated at 100 degrees C. for 18 hours to give a solid polymer blend which was thermoplastic and showed adhesion to steel and aluminum with sheer strengths of greater than 500 psi.

I claim:

1. A solution comprising a polymer which is not reactive with oxazolines selected from the group consisting of polyesters, polyethers, polysulfones, polyamides, polycarbonates, polyphenylene oxides, styrene-acrylonitrile copolymers, polyoxazolines, polyacrylates, and polyurethanes in a liquid oxazoline having formula I or formula II or both

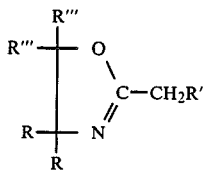

wherein R and R''' independently represent hydrogen, an alkyl group having from 1 to 10 carbon atoms or a hydroxy alkyl group having from 1 to 10 carbon atoms, R' represents hydrogen, an alkyl group having from 1 to 19 carbon atoms, an aryl group having from 6 to 12 carbon atoms, or a hydroxy alkyl group having from 1 to 19 carbon atoms, and R'' represents an alkylene group having from 1 to 12 carbon atoms or an arylene group having from 6 to 12 carbon atoms in which said polymer is present in from about 10 to 50% by weight of the solution and which solution also contains an additive selected from the group consisting of polyisocyanates, polycarboxylic acids, carboxylic acid anhydrides, polyphenolic compounds containing two or more phenolic hydroxyl groups, thiols, acrylic acids and polyepoxides.

2. The solution of claim 1 wherein the equivalent weight ratio of oxazoline to additive in the solution is in the range of from 1:08 to 1:3.

3. The solution of claim 2 wherein the additive is a polyisocyanate.

4. The solution of claim 3 wherein the oxazoline is one of Formula I wherein R and R''' are hydrogen and R' is methyl, the polymer which is not reactive with oxazolines is a polyester and the polyisocyanate is 4,4'-methylene bis(phenyl isocyanate).

5. The solution of claim 3 wherein the oxazoline is one of Formula I in which R is methyl, R' is hexyl and R''' is hydrogen.

6. The solution of claim 3 wherein the oxazoline is one of Formula II wherein R and R''' are hydrogen and R'' is methylene.

7. The solution of claim 3 wherein the additive is maleic anhydride.

8. The solution of claim 3 wherein the additive is methacrylic acid.

9. The process comprising polymerization of the solution of claim 1 at a temperature in the range of from about room temperature to about 200° C.

10. The process of claim 9 wherein the equivalent weight ratio of oxazoline to reactive additive in the solution is in the range of from 1:0.8 to 1:3.

11. The process of claim 10 wherein the additive is a polyisocyanate.

12. The process of claim 11 wherein the oxazoline is one of Formula I wherein R and R''' are hydrogen and R' is methyl, the polymer which is not reactive with oxazolines is a polyester and the polyisocyanate is 4,4'-methylene bis(phenyl isocyanate).

13. The process of claim 11 wherein the oxazoline is one of Formula I wherein R is methyl, R' is hexyl and R''' is hydrogen.

14. The process of claim 11 wherein the oxazoline is one of Formula II wherein R and R''' are hydrogen and R'' is methylene.

15. The process of claim 11 wherein the additive is maleic anhydride.

16. The process of claim 11 wherein the additive is methacrylic acid.

* * * * *